United States Patent
Hirose et al.

(10) Patent No.: US 6,780,902 B2
(45) Date of Patent: Aug. 24, 2004

(54) WATER-BASED COATING COMPOSITION

(75) Inventors: Yuji Hirose, Hiratsuka (JP); Noboru Nakai, Isehara (JP); Reiziro Nishida, Chigasaki (JP); Nobushige Numa, Ebina (JP)

(73) Assignee: Kansai Paint Co., Ltd., Amagasaki (JP)

( * ) Notice: Subject to any disclaimer, the term of this patent is extended or adjusted under 35 U.S.C. 154(b) by 99 days.

(21) Appl. No.: 10/149,435

(22) PCT Filed: Dec. 21, 2000

(86) PCT No.: PCT/JP00/09074

§ 371 (c)(1),
(2), (4) Date: Jun. 24, 2002

(87) PCT Pub. No.: WO01/48105

PCT Pub. Date: Jul. 5, 2001

(65) Prior Publication Data

US 2003/0004230 A1 Jan. 2, 2003

(30) Foreign Application Priority Data

Dec. 27, 1999 (JP) ............................................ 11-371398

(51) Int. Cl.⁷ ............................. C08K 3/20; C08L 63/02
(52) U.S. Cl. ....................... 523/409; 523/412; 525/174; 525/177
(58) Field of Search ................................ 523/409, 412; 525/174, 177

(56) References Cited

U.S. PATENT DOCUMENTS 5,840,384 A    11/1998   Noda et al. ................. 428/35.8

FOREIGN PATENT DOCUMENTS

| EP | 0006334 | | 1/1980 |
|----|---------|---|--------|
| EP | 0060505 | A1 | 9/1982 |
| JP | 63-41934 | | 8/1988 |
| JP | 07-113057 | | 5/1995 |
| JP | 07-138523 | | 5/1995 |
| JP | 07-268064 | | 10/1995 |
| JP | 11-343456 | | 12/1999 |
| JP | 200123414 | * | 8/2001 |

OTHER PUBLICATIONS

Chem. Abstracts of JP'114, 2001.*

International Search Report dated Apr. 10, 2001.

* cited by examiner

Primary Examiner—Philip Tucker
Assistant Examiner—D. Aylward
(74) Attorney, Agent, or Firm—Armstrong, Kratz, Quintos, Hanson & Brooks, LLP

(57) ABSTRACT

The present invention provides an aqueous coating composition comprising a carboxyl-containing, acrylic-modified polyester resin (B) neutralized and dispersed in an aqueous medium, the polyester resin (B) being obtainable by reacting a carboxyl-containing acrylic resin (c) with an epoxy-modified polyester resin (A) prepared by esterification of a carboxyl-containing polyester resin (a) having a number average molecular weight of 1,000 to 30,000 and an acid value of 5 to 200 mg KOH/g with a 1,2-epoxy-containing low-molecular-weight epoxy compound (b) having a number average molecular weight of 1,200 or less.

8 Claims, No Drawings

WATER-BASED COATING COMPOSITION

TECHNICAL FIELD

The present invention relates to an aqueous coating composition, in particular a novel aqueous coating composition free of the problems of environmental hormones and suitable for coating the inner surfaces of cans.

BACKGROUND OF THE INVENTION

In order to solve the problem of global environmental pollution caused by the evaporation of organic solvents, aqueous coating compositions have been replacing organic solvent-based coating compositions in the field of coating compositions for the inner surfaces of cans such as food cans. Japanese Examined Patent Publication No. 1988-41934 and Japanese Unexamined Patent Publication No. 1995-138523 propose, as the aqueous coating compositions, compositions comprising an epoxy-modified acrylic resin prepared by reacting or mixing an epoxy resin with a carboxyl-containing acrylic resin.

In these known aqueous coating compositions, a high-molecular-weight epoxy resin obtained by reacting a low-molecular-weight epoxy resin with bisphenol A is generally used as the starting epoxy resin, in order to achieve good application workability and high film performance. As a result, unreacted bisphenol A remains in the compositions and causes the problem of environmental hormones. However, if a low-molecular-weight epoxy resin in which no bisphenols are detected is used as the starting epoxy resin to avoid the problem, the resulting aqueous coating composition is poor in application workability and film performance characteristics such as adhesion to substrates, flavor protecting properties, etc., and thus is unsuitable as a coating composition for the inner surfaces of cans.

Therefore, no fundamental solution has been proposed so far to avoid the problem of environmental hormones caused by bisphenols in aqueous coating compositions comprising an epoxy-modified acrylic resin.

DISCLOSURE OF THE INVENTION

An object of the present invention is to provide a novel aqueous coating composition free of the problems of the prior art.

Another object of the invention is to provide a novel aqueous coating composition which is free of the problem of environmental hormones caused by bisphenols while having good application workability and high film performance.

Other objects and features of the invention will be apparent from the following description.

The present invention provides an aqueous coating composition comprising a carboxyl-containing, acrylic-modified polyester resin (B) neutralized and dispersed in an aqueous medium, the polyester resin (B) being obtainable by reacting a carboxyl-containing acrylic resin (c) and an epoxy-modified polyester resin (A) prepared by esterification of a carboxyl-containing polyester resin (a) having a number average molecular weight of 1,000 to 30,000 and an acid value of 5 to 200 mg KOH/g with a 1,2-epoxy-containing low-molecular-weight epoxy compound (b) having a number average molecular weight of 1,200 or less.

The inventors carried out extensive research to develop an aqueous coating composition which is free of the problem of environmental hormones caused by bisphenols and which is suitable for coating the inner surfaces of cans. As a result, the inventors found that when an aqueous coating composition is prepared by neutralizing and dispersing a resin obtained by sequentially reacting a specific carboxyl-containing polyester resin, a specific low-molecular-weight epoxy compound in which no bisphenols are detected, and a carboxyl-containing acrylic resin as starting materials, the aqueous coating composition contains no free bisphenols and is capable of achieving the same application workability and film performance as attained by known aqueous coating compositions comprising an epoxy-modified acrylic resin. The present invention has been accomplished based on these new findings.

The epoxy-modified polyester resin (A) in the aqueous coating composition of the invention is prepared by esterification of a carboxyl-containing polyester resin (a) having a number average molecular weight of 1,000 to 30,000 and an acid value of 5 to 200 mg KOH/g, and a 1,2-epoxy-containing low-molecular-weight epoxy compound (b) having a number average molecular weight of 1,200 or less.

It is essential that the carboxyl-containing polyester resin (a) have a number average molecular weight of 1,000 to 30,000, and an acid value of 5 to 200 mg KOH/g. If the number average molecular weight is less than 1,000 or the acid value exceeds 200 mg KOH/g, side reactions are likely to occur at the time of addition reaction of the carboxyl group and the epoxy group of the epoxy compound (b), increasing the viscosity of the resulting resin (A) and thereby making the production of the composition difficult. On the other hand, a number average molecular weight exceeding 30,000 or an acid value less than 5 mg KOH/g makes it difficult to disperse the polyester resin (B) in an aqueous medium in the following step. Thus, molecular weights and acid values outside the above-specified range are undesirable.

Preferably, the carboxyl-containing polyester resin (a) has a number average molecular weight of 2,000 to 10,000, and an acid value of about 20 to 150 mg KOH/g.

The polyester resin (a) is prepared by polycondensation of a polyhydric alcohol with a polybasic acid. Polyhydric alcohols are polyols such as alkane polyols, oxyalkylene polyols, polyoxyalkylene polyols, alicyclic polyols and the like. Typical examples of polyhydric alcohols include ethylene glycol, 1,2-propylene glycol, 1,3-propylene glycol, 1,4-butanediol, 1,3-butanediol, 2-methyl-1,3-propanediol, 1,5-pentanediol, 1,3-pentanediol, 1,6-hexanediol, 1,5-hexanediol, neopentyl glycol, glycerin, 2-methylglycerin, trimethylolpropane, trimethylolethane, pentaerythritol and like alkane polyols; diethylene glycol, dipropylene glycol and like oxyalkylene polyols; triethylene glycol, tetraethylene glycol, polyethylene glycol, tripropylene glycol, polypropylene glycol and like polyoxyalkylene polyols; 1,4-cyclohexane dimethanol and like alicyclic polyols; etc. Examples of polybasic acids include adipic acid, sebacic acid, glutaric acid, phthalic acid, isophthalic acid, terephthalic acid, maleic acid, fumaric acid, succinic acid, pimelic acid, azelaic acid, dodecanedioic acid, cyclohexanedicarboxylic acid, tetrahydrophthalic acid, methyltetrahydrophthalic acid, endomethylene-tetrahydrophthalic acid, methylendomethylene-tetrahydrophthalic acid, hexahydrophthalic acid, naphthalenedicarboxylic acid, trimellitic acid, butanetricarboxylic acid, anhydrides of these acids, and the like.

In the polycondensastion of a polyhydric alcohol with a polybasic acid, a strong protonic acid, a heavy metal oxide or the like can be used as a polycondensation catalyst. Examples of strong protonic acids include sulfuric acid, benzenesulfonic acid, p-toluenesulfonic acid and the like. Examples of heavy metal oxides include tetrabutyl titanate, dibutyltin oxide, antimony trioxide, manganese dioxide and the like.

The polyester resin (a) can be prepared by subjecting a polyhydric alcohol and a polybasic acid to condensation so as to introduce carboxyl groups into the resin molecule and thereby impart the specific acid value required for the invention. Alternatively, the resin (a) may be obtained by first preparing a hydroxyl-containing polyester resin, followed by addition of an acid anhydride to the hydroxyl groups to impart the specific acid value. Examples of the acid anhydrides include phthalic anhydride, trimellitic anhydride, succinic anhydride, maleic anhydride, hexahydrophthalic anhydride, pyromellitic anhydride and the like.

It is essential that the 1,2-epoxy-containing low-molecular-weight epoxy compound (b) have a number average molecular weight of 1,200 or less. The low-molecular-weight epoxy compound, in which no unreacted bisphenols are detected, is used to modify the carboxyl-containing polyester resin (a). As a result, an aqueous coating composition can be obtained which contains no free bisphenols while having good application workability and high film performance. Therefore, the obtained aqueous coating composition is free of the problem of environmental hormones.

The epoxy compound (b) preferably has an epoxy equivalent of 140 to 250, and a number average molecular weight of 250 to 900.

Compounds usable as the epoxy compound (b) include, for example, bisphenol A diglycidyl ether and like bisphenol A epoxy resins; bisphenol F diglycidyl ether and like bisphenol F epoxy resins; dimer acid diglycidyl ester, polypropylene glycol diglycidyl ether, hydrogenated bisphenol A diglycidyl ether, epoxycyclohexylmethyl epoxycyclohexanecarboxylate, epoxy phenol novolac, triglycidyl isocyanurate like non-bisphenol epoxy resins; etc.

The epoxy-modified polyester resin (A) in the composition of the invention can be preferably prepared by esterification of the carboxyl-containing polyester resin (a) with the low-molecular-weight epoxy compound (b) in such a ratio that the molar ratio of the carboxyl groups in the resin (a) to the epoxy groups in the compound (b) is 1:2 to 1:1. The epoxy-modified polyester resin (A) thus obtained has an epoxy equivalent of about 2,000 to 10,000, and a number average molecular weight of about 4,000 to 100,000. It is suitable that the epoxy-modified polyester resin (A) have an epoxy equivalent and number average molecular weight within the above ranges, from the viewpoints of the stability, application workability and film performance of the resulting aqueous coating composition.

Preferably, the polyester resin (A) has an epoxy equivalent of about 2,500 to 7,000, and a number average molecular weight of about 5,000 to 50,000.

The esterification of the polyester resin (a) with the epoxy compound (b) can be effected by, for example, heating the mixture of the resin (a) and compound (b) at 120 to 150° C for about 1 to 8 hours in the presence of an organic solvent and a catalyst such as tertiary alkylamine, tetraalkylammonium halide or the like, to thereby obtain the desired resin (A).

Usually, the polyester resin (A) is obtained by addition reaction of the terminal carboxyl group of the polyester resin (a) and the terminal 1,2-epoxy group of the epoxy compound (b), and thus has a hydroxyl group in the side chain of the molecule. Since the hydroxyl group in the side chain acts to increase the adhesion to metal substrates, the presence of the hydroxyl group is advantageous in improving the adhesion to substrates and corrosion resistance of the resulting coating film.

The carboxyl-containing acrylic resin (c) to be reacted with the polyester resin (A) for preparing the carboxyl-containing, acrylic-modified polyester resin (B) is an acrylic polymer comprising, as an essential monomer component, acrylic acid, methacrylic acid, itaconic acid, fumaric acid or like polymerizable unsaturated carboxylic acid. It is preferable that the polymer have an acid value of 100 to 500 mg KOH/g, from the viewpoints of the stability of the resin (B) in the aqueous medium, and the processability, corrosion resistance and water resistance of the resulting coating film, etc.

Examples of monomer components other than the polymerizable unsaturated carboxylic acid for preparation of the acrylic resin (c) include methyl (meth)acrylate, ethyl (meth)acrylate, propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, cetyl (meth)acrylate, and like $C_{1-18}$ alkyl esters of acrylic or methacrylic acid; benzyl (meth)acrylate, cyclohexyl (meth)acrylate, isobornyl (meth)acrylate; styrene, a-methylstyrene, vinyltoluene and like aromatic vinyl monomers; hydroxyethyl (meth)acrylate, hydroxypropyl (meth)acrylate, hydroxybutyl (meth)acrylate, hydroxyamyl (meth)acrylate, hydroxyhexyl (meth)acrylate, and like hydroxyalkyl (meth)acrylates; hydroxyl-containing, caprolactone-modified alkyl (meth)acrylate prepared by ring-opening addition reaction of 1 to 5 moles of ε-caprolactone to 1 mol of one of the above hydroxyalkyl (meth)acrylates, and like hydroxyl-containing polymerizable unsaturated monomers; acrylamide, methacrylamide, N-methoxymethyl (meth)acrylamide, N-ethoxymethyl (meth)acrylamide, N-n-propoxymethyl (meth)acrylamide, N-isopropoxymethyl (meth)acrylamide, N-n-butoxymethyl (meth)acrylamide, N-sec-butoxymethyl (meth)acrylamide, N-tert-butoxymethyl (meth)acrylamide and like acrylamide monomers; acrylonitrile, methacrylonitrile, vinyl acetate, ethylene and butadiene; and the like.

The acrylic resin (c) can be obtained by, for example, heating a monomer mixture of a polymerizable unsaturated carboxylic acid and other monomer component(s) at 80 to 150° C. for about 1 to 10 hours in an organic solvent in the presence of a radical polymerization initiator or chain transfer agent, to thereby effect copolymerization. As the polymerization initiator, an organic peroxide polymerization initiator or azo polymerization initiator can be used. Examples of organic peroxide polymerization initiators include benzoyl peroxide, t-butylperoxy-2-ethylhexanoate, di-t-butylperoxide, t-butylperoxybenzoate and t-amylperoxy-2-ethylhexanoate. Examples of azo polymerization initiators include azobisisobutyronitrile and azobisdimethyl-valeronitrile. The chain transfer agent may be, for example, α-methylstyrene dimer, a mercaptan or the like.

The reaction of the epoxy-modified polyester resin (A) and the carboxyl-containing acrylic resin (c) can be carried out usually by heating a mixture of the resins at about 80 to 120° C. for about 0.5 to 8 hours in an organic solvent in the presence of a catalyst such as triethylamine, dimethylethanolamine or like tertiary amine or triphenylphosphine or like quaternary salt compound. Thus, the carboxyl-containing, acrylic-modified polyester resin (B) can be preferably prepared. When the polyester resin (A) and the acrylic resin (c) are reacted with each other, conversion to an onium salt or like reaction usually occurs together with the esterification as the main reaction.

The proportions of the polyester resin (A) and the carboxyl-containing acrylic resin (c) for use in the above reaction can be selected so as to achieve good application workability, high film performance, etc. It is usually preferable that the weight ratio of the resin (A) to the resin (c) be 60/40 to 90/10, more preferably 70/30 to 90/10, based on solids.

The carboxyl-containing, acrylic-modified polyester resin (B) obtained by the above reaction has an acid value of preferably 15 to 200 mg KOH/g, from the viewpoints of the dispersion stability in an aqueous medium, the water resistance of the resulting coating film, etc. Further, it is usually desirable that the resin (B) have substantially no epoxy group, from the viewpoint of storage stability of the resulting composition.

The polyester resin (B) is neutralized and dispersed in an aqueous medium. For the neutralization, a neutralizing agent such as an amine, ammonia or the like is preferably usable. Typical examples of amines include triethylamine, triethanolamine, dimethylethanolamine, diethylethanolamine, morpholine and the like. Among these amines, triethylamine and dimethylethanolamine are particularly preferable. The degree of neutralization of the polyester resin (B) is not limited, but neutralization with 0.3 to 1.0 equivalent relative to the carboxyl groups in the resin (B) is preferable.

The aqueous medium in which the polyester resin (B) is to be dispersed may be water or a mixture of water and an organic solvent. The organic solvent may be any of known organic solvents, as long as it does not adversely affect the stability of the polyester resin (B) in the aqueous medium and is miscible with water.

Preferably, the organic solvent is an alcohol solvent, cellosolve solvent, carbitol solvent or the like. Specific examples of the organic solvent include n-butanol and like alcohol solvents; ethylene glycol monobutyl ether, ethylene glycol monoisopropyl ether, ethylene glycol monomethyl ether, propylene glycol monomethyl ether and like cellosolve solvents; and diethylene glycol monoethyl ether and like carbitol solvents. Further, an inert organic solvent immiscible with water may be used within a range that does not adversely affect the stability of the acrylic-modified polyester resin in an aqueous medium. Examples of such organic solvents include toluene, xylene and like aromatic hydrocarbon solvents; ethyl acetate, butyl acetate and like ester solvents; and methyl ethyl ketone and like ketone solvents. In the composition of the invention, the proportion of the organic solvent in the aqueous medium is preferably not greater than 50 wt. %, in consideration of the environmental protection.

The polyester resin (B) can be neutralized and dispersed in an aqueous medium by a know method. For example, the polyester resin (B) may be gradually added, with stirring, to an aqueous medium containing a neutralizing agent; or the polyester resin (B) may be first neutralized with a neutralizing agent, followed by addition of an aqueous medium to the neutralized resin with stirring, or addition of the neutralized resin to an aqueous medium with stirring.

The composition of the invention may further comprise a crosslinking agent, in addition to the neutralized polyester resin (B). Usable crosslinking agents include resol type phenol resins, melamine resins, benzoguanamine resins and the like. Examples of phenol components in the phenol resins include o-cresol, p-cresol, p-tert-butylphenol, p-ethylphenol, 2,3-xylenol, 2,5-xylenol, p-tert-amylphenol, p-nonylphenol, p-cyclohexylphenol and like bifunctional phenols; carbolic acid, m-cresol, m-ethylphenol, 3,5-xylenol, m-methoxphenol and like trifunctional phenols; 2,4-xylenol, 2,6-xylenol and like monofunctional phenols; bisphenol B, bisphenol F and like tetrafunctional phenols; etc. These components may be used either singly or in combination. It is preferable to avoid the use of bisphenol resins, since they are likely to cause the problem of environmental hormones. Further, the composition of the invention may contain a surfactant, a defoaming agent or the like, if necessary.

The aqueous coating composition of the invention preferably has a solid content of about 15 to 40 wt. %.

The composition of the invention is suitable for coating the inner surfaces of cans such as food cans. The composition is applicable to various metal substrates, such as aluminum plates, steel plates and like metal plates; steel plates coated with zinc, chromium, tin, aluminium or the like; and steel plates whose surfaces have been subjected to chemical conversion with chromic acid, iron phosphate, zinc phosphate or the like. The composition can be applied to the surface of a metal substrate by a known method such as roll coating, spray coating, brush coating, electrodeposition coating or the like. A coating thickness of 2 to 30 $\mu$m is usually sufficient. The coating is baked usually at about 150 to 280° C., preferably about 180 to 220° C., for about 20 to 600 seconds, preferably about 30 to 300 seconds.

BEST MODE FOR CARRYING OUT THE INVENTION

The following Production Examples, Examples and Comparative Examples are provided to illustrate the invention in further detail. In these examples, parts and percentages are all by weight.

PRODUCTION EXAMPLE 1

Production of Carboxyl-containing Acrylic Resin

Ethylene glycol monobutyl ether (1,200 parts) was placed in a reaction vessel, heated to 100° C. and maintained at the temperature. A mixture of methacrylic acid (400 parts), styrene (500 parts), ethyl acrylate (100 parts), "Perbutyl O " (a product of NOF CORPORATION, a peroxide polymerization initiator) (35 parts) and ethylene glycol monobutyl ether (140 part) was added dropwise over 3 hours. After completion of the addition, the resulting mixture was aged at 100° C. for 2 hours. Then, 570 parts of n-butanol was added, giving a carboxyl-containing acrylic resin solution having a solid content of 36%. The resin had a number average molecular weight of about 7,000 and an acid value of 260 mg KOH/g.

EXAMPLE 1

Ethylene glycol (310 parts), propylene glycol (380 parts), adipic acid (234 parts), isophthalic acid (580 parts), terephthalic acid (664 parts), cyclohexanone (100 parts) and dibutyltin oxide (0.5 parts) were placed in a reaction vessel, heated to 230° C. over 3 hours with stirring, and maintained at the temperature for 5 hours. After cooling the mixture to 160° C., 25 parts of phthalic anhydride was added, and the resulting mixture was maintained at 160° C. for 2 hours, giving a polyester resin solution. The resin had an acid value of 50 mg KOH/g and a number average molecular weight of about 4,000.

Into 1,000 parts of the polyester resin solution were added bisphenol A diglycidyl ether (epoxy equivalent: about 190; number average molecular weight: about 350; no residual bisphenol A was detected therein) (240 parts), cyclohexanone (210 parts) and tri-n-butylamine (0.5 parts). The resulting mixture was maintained at 130° C. for 5 hours, giving an epoxy-modified polyester resin solution. The resin had an epoxy equivalent of about 3,000 and a number average molecular weight of about 20,000.

Subsequently, the carboxyl-containing acrylic resin solution with a solid content of 36% obtained in Production Example 1 (870 parts) and ethylene glycol monobutyl ether (220 parts) were added to the epoxy-modified polyester resin solution, followed by uniform stirring. The mixture was cooled to 85° C., and after adding 77 parts of dimethylethanolamine, the resulting mixture was maintained at 85° C. for 1 hour. Then, 3,600 parts of deionized water was added dropwise over 1 hour, to obtain an aqueous coating composition of the invention as an aqueous dispersion of a resin with an acid value of 37 mg KOH/g and a particle size of 200 nm, the aqueous dispersion having a solid content of 25% and a viscosity of 4,000 mPas.

EXAMPLE 2

Ethylene glycol (124 parts), propylene glycol (152 parts), adipic acid (182 parts), isophthalic acid (500 parts), terephthalic acid (660 parts), cyclohexanone (100 parts) and dibutyltin oxide (0.5 parts) were placed in a reaction vessel, heated to 230° C. over 3 hours with stirring, and maintained at the temperature for 8 hours, to obtain a polyester resin solution. The resin had an acid value of 40 mg KOH/g and a number average molecular weight of about 5,000.

Into 1,000 parts of the polyester resin solution were added bisphenol A diglycidyl ether (epoxy equivalent: about 190; number average molecular weight: about 350; no residual bisphenol A was detected therein) (200 parts), cyclohexanone (200 parts) and tri-n-butylamine (0.5 parts). The mixture was maintained at 130° C. for 3 hours with stirring, giving an epoxy-modified polyester resin solution. The resin had an epoxy equivalent of about 3,000 and a number average molecular weight of about 20,000.

Then, the carboxyl-containing acrylic resin solution with a solid content of 36% obtained in Production Example 1 (840 parts) and ethylene glycol monobutyl ether (220 parts) were added to the epoxy-modified polyester resin solution, followed by uniform stirring. The mixture was cooled to 85° C., and after adding 75 parts of dimethylethanolamine, the resulting mixture was maintained at 85° C. for 1 hour. Thereafter, 3,500 parts of deionized water was added dropwise over 1 hour, to obtain an aqueous coating composition of the invention as an aqueous dispersion of a resin with an acid value of 37 mg KOH/g and a particle size of 250 nm, the aqueous dispersion having a solid content of 25% and a viscosity of 3,000 mPas.

EXAMPLE 3

Ethylene glycol (155 parts), propylene glycol (190 parts), adipic acid (230 parts), isophthalic acid (530 parts), terephthalic acid (750 parts), cyclohexanone (100 parts) and dibutyltin oxide (0.5 parts) were placed in a reaction vessel, heated to 230° C. over 3 hours with stirring, and maintained at the temperature for 8 hours. The mixture was cooled to 160° C., and after adding 8 parts of phthalic anhydride, the resulting mixture was maintained at 160° C. for 2 hours, giving a polyester resin solution. The resin had an acid value of 20 mg KOH/g and a number average molecular weight of about 6,000.

Into 1,000 parts of the polyester resin solution were added bisphenol A diglycidyl ether (epoxy equivalent: about 190; number average molecular weight: about 350; no residual bisphenol A was detected therein) (120 parts), cyclohexanone (200 parts) and tri-n-butylamine (0.5 parts). The mixture was maintained at 130° C. for 3 hours, giving an epoxy-modified polyester resin solution. The resin had an epoxy equivalent of about 3,000 and a number average molecular weight of about 20,000.

Subsequently, the carboxyl-containing acrylic resin solution with a solid content of 36% obtained in Production Example 1 (780 parts) and ethylene glycol monobutyl ether (220 parts) were added to the epoxy-modified polyester resin solution, followed by uniform stirring. The mixture was cooled to 85° C., and after adding 70 parts of dimethylethanolamine, the resulting mixture was maintained at 85° C. for 1 hour. Subsequently, 3,200 parts of deionized water was added dropwise over 1 hour, to thereby obtain an aqueous coating composition of the invention as an aqueous dispersion of a resin with an acid value of 37 mg KOH/g and a particle size of 300 nm, the aqueous dispersion having a solid content of 25% and a viscosity of 3,000 mPas.

COMPARATIVE EXAMPLE 1

Into a reaction vessel were placed bisphenol A diglycidyl ether (epoxy equivalent: about 190; number average molecular weight: about 350; no residual bisphenol A was detected therein) (1,000 parts), bisphenol A (556 parts), ethylene glycol monobutyl ether (172 parts) and 50% aqueous tetramethylammonium solution (1.6 parts). The mixture was heated to 140° C. with stirring and maintained at the temperature for 5 hours, giving a high-molecular-weight epoxy resin solution. The resin had a solid content of 90%, an epoxy equivalent of 3,000 and a number average molecular weight of 8,000.

Subsequently, the carboxyl-containing acrylic resin solution having a solid content of 36% obtained in Production Example 1 (630 parts) and ethylene glycol monobutyl ether (110 parts) were added to 1,000 parts of the epoxy resin solution, followed by uniform stirring. The mixture was cooled to 85° C., and after adding 50 parts of deionized water and 60 parts of dimethylethanolamine, the resulting mixture was maintained at 85° C. for 1 hour. Thereafter, 2,600 parts of deionized water was added dropwise over 1 hour, to obtain a comparative aqueous coating composition as an aqueous dispersion of a resin with an acid value of 36 mg KOH/g and a particle size of 180 nm, the aqueous dispersion having a solid content of 25% and a viscosity of 3,000 mPas.

COMPARATIVE EXAMPLE 2

Into a reaction vessel were placed bisphenol A diglycidyl ether (epoxy equivalent: about 190; number average molecular weight: about 350; no residual bisphenol A was detected therein) (1,800 parts), bisphenol A (1,487 parts), diethylene glycol monobutyl ether (363 parts) and a 50% aqueous tetramethylammonium solution (1 part). The mixture was heated to 140° C. with stirring, and maintained at the temperature for 8 hours, giving a high-molecular-weight epoxy resin solution. The resin had a solid content of 90%, an epoxy equivalent of 9,100, and a number average molecular weight of 5,500.

Then, the carboxyl-containing acrylic resin solution with a solid content of 36% obtained in Production Example 1 (630 parts) and ethylene glycol monobutyl ether (113 parts) were added to 1,000 parts of the epoxy resin solution, followed by uniform stirring. The mixture was cooled to 85° C., and after adding deionized water (18 parts) and dimethylethanolamine (60 parts), the resulting mixture was maintained at 85° C. for 1 hour. Thereafter, 2,600 parts of deionized water was added dropwise over 1 hour, to obtain a comparative aqueous coating composition as an aqueous dispersion of a resin with an acid value of 36 mg KOH/g and a particle size of 350 nm, the aqueous dispersion having a solid content of 25% and a viscosity of 800 mPas. Performance test of aqueous coating composition The aqueous coating compositions obtained in Examples 1 to 3 and Comparative Examples 1 and 2 were applied by spray coating to clean, tin-free steel plates with a thickness of 0.23 mm, to a dry thickness of 10 μm, and baked at 200° C. for 3 minutes for curing. Using the coated plates, film performance characteristics were tested by the following methods. Also, the bisphenol A concentration in each aqueous coating composition was measured.

Test Methods

Gel fraction: Each of the cured coating films was subjected to extraction with refluxing acetone for 6 hours to find the percentage by weight of the non-extracted portion of the coating film after extraction, relative to the coating film before extraction.

Adhesion to substrate: A nylon film was sandwiched between two coated plates (150 mm×5 mm) in such a manner that the nylon film came into contact with the coated surfaces. The coated plates with the nylon film was heated at 200° C. for 60 seconds, compressed at 200° C. for 30 seconds to fuse the nylon film to the coating films, and used as a test piece. The T-peel adhesion strength of the test piece was measured using a tensile tester (tradename: "Autograph AGS-500A", manufactured by Shimadzu Corporation). The tensile test was carried out at 20° C. with a pulling speed of 200 mm/min.

Processability: The coated plates were cut to a size of 40 mm×50 mm, and bent in half in such a manner that the coated surfaces faced outwards. A 3 kg weight was dropped onto the bent part of each plate from a height of 42 cm. A 20 mm long portion from the bent part was dipped in a 1% aqueous sodium chloride solution, and a voltage (6.5 V) was applied to measure the current. The smaller the current, the better the processability.

Corrosion resistance: The coated plates were cut to a size of 150 mm×70 mm, and crosswise cuts reaching the substrates were made on the coated plates. The coated plates were subjected to a 3-week salt spray test, and then visually inspected and rated on the following scale.

A: The width of the rusted portion on each side of the cuts was less than 2 mm.

B: The width of the rusted portion on each side of the cuts was not less than 2 mm but less than 5 mm.

C: The width of the rusted portion on each side of the cuts was 5 mm or more.

Acid resistance: The coated plates whose back faces and side faces had been sealed were dipped in a 10% aqueous hydrochloric acid solution at 20° C. for 1 week. Then, the coated surfaces were visually inspected and rated on the following scale.

A: No abnormalities.

B: Slight blushing.

C: Serious blushing.

Alkali resistance: The coated plates whose back faces and side faces had been sealed were dipped in a 10% aqueous caustic soda solution at 20° C. for 1 week. Then, the coated surfaces were visually inspected and rated on the following scale.

A: No abnormalities.

B: Slight blushing.

C: Serious blushing.

Bisphenol A concentration: The aqueous coating compositions obtained in Examples and Comparative Examples were dissolved in tetrahydrofuran, and analyzed by high performance liquid chromatography to determine the bisphenol A concentration in each composition.

Table 1 shows the results.

TABLE 1

|  | Example | | | Comparative Example | |
|---|---|---|---|---|---|
|  | 1 | 2 | 3 | 1 | 2 |
| Gel fraction (%) | 90.5 | 89.0 | 91.0 | 92.4 | 90.8 |
| Adhesion to substrate (adhesion strength, kg/5 mm) | 3.02 | 2.50 | 3.72 | 3.65 | 3.60 |
| Processability (current value, mA) | 0.32 | 0.50 | 0.29 | 0.43 | 0.38 |
| Corrosion resistance | A | A | A | A | A |
| Acid resistance | A | A | A | A | A |
| Alkali resistance | A | A | A | A | A |
| Bisphenol A concentration (ppm) | Not detected | | | 40 | 2,000 |

The aqueous coating composition of the invention is prepared using a specific carboxyl-containing polyester resin, a specific low-molecular-weight epoxy compound and a carboxyl-containing acrylic resin as starting materials. As a result, the composition contains no free bisphenols and thus is free of the problem of environmental hormones. Moreover, the composition has excellent application workability, and is also excellent in film performance characteristics such as adhesion to substrates, processability, corrosion resistance, acid resistance, alkali resistance, flavor protecting properties, etc.

Therefore, the composition is suitable for coating the inner surfaces of cans such as food cans.

What is claimed is:

1. An aqueous coating composition comprising a carboxyl-containing, acrylic-modified polyester resin (B) neutralized and dispersed in an aqueous medium, the polyester resin (B) being obtainable by reacting a carboxyl-containing acrylic resin (c) and an epoxy-modified polyester resin (A) prepared by esterification of a carboxyl-containing polyester resin (a) having a number average molecular weight of 1,000 to 30,000 and an acid value of 5 to 200 mg KOH/g with a 1,2-epoxy-containing low-molecular-weight epoxy compound (b) which is a bisphenol A epoxy resin or a bisphenol F epoxy resin, the epoxy compound (b) having an epoxy equivalent of 140 to 250 and a number average molecular weight of 250 to 900.

2. An aqueous coating composition according to claim 1, wherein the carboxyl-containing polyester resin (a) has a number average molecular weight of 2,000 to 10,000 and an acid value of 20 to 150 mg KOH/g.

3. An aqueous coating composition according to claim 1, wherein the epoxy-modified polyester resin (A) is a resin prepared by esterification of the carboxyl-containing polyester resin (a) with the low-molecular-weight epoxy compound (b) in such a ratio that the molar ratio of the carboxyl groups of the resin (a) to the epoxy groups in the compound (b) is 1:2 to 1:1.

4. An aqueous coating composition according to claim 1, wherein the epoxy-modified polyester resin (A) has an epoxy equivalent of 2,000 to 10,000 and a number average molecular weight of 4,000 to 100,000.

5. An aqueous coating composition according to claim 1, wherein the carboxyl-containing acrylic resin (c) has an acid value of 100 to 500 mg KOH/g.

6. An aqueous coating composition according to claim 1, wherein the polyester resin (B) is a resin prepared by reacting the epoxy-modified polyester resin (A) and the carboxyl-containing acrylic resin (c) in an (A)/(c) weight ratio of 60/40 to 90/10 based on solids.

7. An aqueous coating composition according to claim 1, wherein the carboxyl-containing, acrylic-modified polyester resin (B) has an acid value of 15 to 200mg KOH/g.

8. An aqueous coating composition according to claim 1, which further comprises a crosslinking agent.

* * * * *